Figures 1, 2:
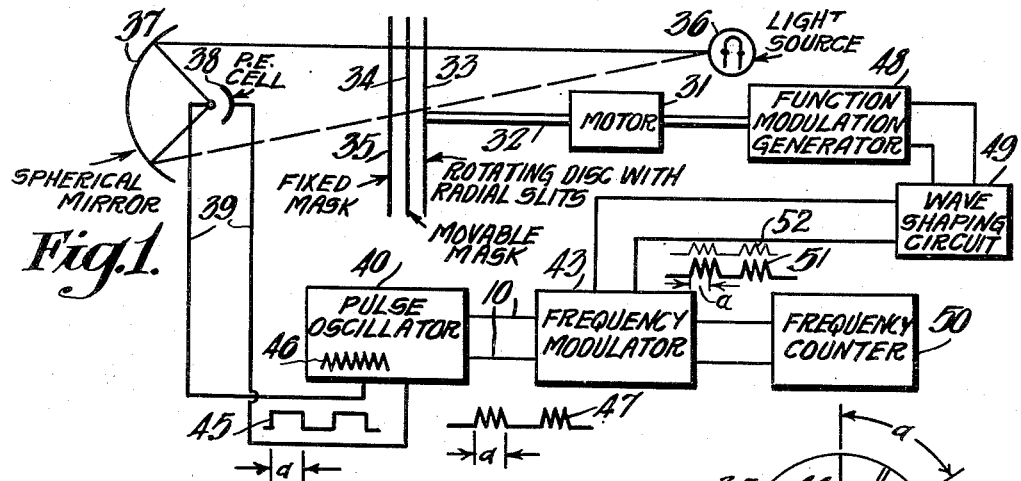

May 13, 1947.　　　J. L. WHITTAKER　　　2,420,509
ELECTRON COMPUTING DEVICE
Filed July 28, 1943　　　2 Sheets—Sheet 1

Inventor
James L. Whittaker
By
C D Tuska
Attorney

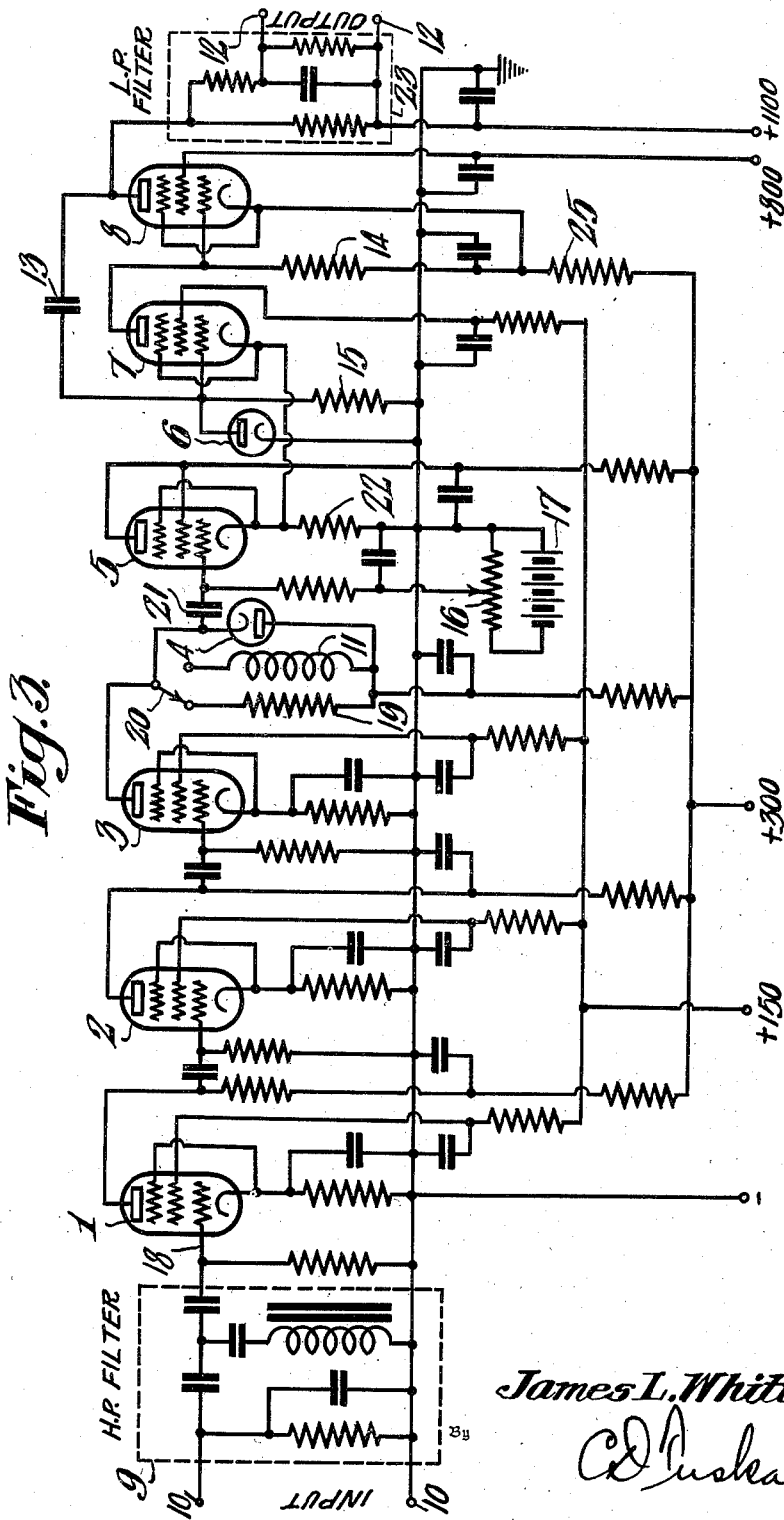

Patented May 13, 1947

2,420,509

UNITED STATES PATENT OFFICE 2,420,509

ELECTRON COMPUTING DEVICE

James L. Whittaker, Princeton, N. J., assignor to Radio Corporation of America, a corporation of Delaware Application July 28, 1943, Serial No. 496,685

7 Claims. (Cl. 177—351)

This invention relates generally to computing devices and particularly to electronic computing devices in which current pulses, having characteristics corresponding to a predetermined mathematical function of the variable angular displacement of two elements, are derived.

In the copending application of Jan A. Rajchman and Richard L. Snyder, Jr., Ser. No. 437,002, filed March 31, 1942, several devices are disclosed for deriving trains of voltage pulses, the number of pulses in each train being proportional to a function of the angular displacement of two mechanical elements. These devices depend upon the interruptions of a light beam by fiducial marks on a mechanical device in relative motion with respect to the source of the light beam.

In another copending application of Jan A. Rajchman, Ser. No. 523,130, filed February 19, 1944, there is disclosed means for deriving electric current pulses having a frequency characteristic proportional either linearly, or to a predetermined function, of the angular displacement of two mechanical elements, in which a carrier having fiducial marks characteristic of the desired mathematical function is not required. In the last-mentioned copending application means are provided for deriving electric pulses whose number per unit time is a function of the angular displacement of two mechanical elements, and in which regularly occurring pulses, whose duration is proportional to said angular displacement of said elements, key a source of local oscillations. A light beam is interrupted by a slotted rotating mask which rotates with respect to at least one adjustable mask which provides an aperture proportional to the desired angular displacement. The light source thus interrupted provides square-wave pulses which key a pulse oscillator to provide trains of pulses which are applied to a frequency counting circuit. A current of amplitude substantially proportional to the desired value of the function of the angular displacement of the adjustable mask is derived from the frequency counting circuit.

The instant invention contemplates an improvement upon the last-mentioned copending application, wherein the values of predetermined functions of the desired angular displacement of the adjustable mask may be obtained by frequency-modulating the keyed pulse oscillator by means of regularly occurring voltage wave forms shaped to provide the desired function.

Briefly, a typical method of accomplishing the generation of desired functions of selected angles comprises a function generator synchronized with the motor drive which rotates the rotating discs which interrupt the light beam, and a wave-shaping circuit to provide the desired wave form for modulating the pulse oscillator. The pulses derived from the pulse oscillator and from the wave-shaping circuit are applied to a conventional modulator circuit, the output of which is applied to a measuring circuit which indicates the number of pulses per unit time.

An object of the invention is to provide an improved electronic computer for deriving the values of predetermined functions of the angular displacement of two mechanical elements. Another object is to provide an improved electronic computer in which means are provided for generating regularly occurring pulses whose duration is proportional to the angular displacement of at least two mechanical elements, means for applying said pulses to key a source of oscillations, means for deriving synchronously with said pulses a second pulse train having a wave shape characteristic of the desired function, means for frequency-modulating said trains of pulses, and means for applying said frequency-modulated pulse trains to a frequency measuring circuit. Another object of the invention is to provide means for deriving from the aforesaid means a current of amplitude substantially proportional to the value of the desired function of angular displacement of said elements.

The invention will be described by reference to the accompanying drawings of which Figure 1 is a schematic diagram of one embodiment thereof; Figure 2 is an elevational view of the fixed and rotating marks in the device shown in Figure 1; Figure 3 is a schematic circuit diagram of the frequency measuring circuit forming a part of the aforesaid embodiment, and Figures 4a through 4g are a series of graphs indicating the operating characteristics of the various circuit components of Figure 3. Similar reference characters are applied to similar elements throughout the drawings.

Referring to Figure 1, a motor 31 having a rotating shaft 32 rotates a disc 33 within which is included a narrow radial slot 44. A fixed mask 35 and a movable mask 34, arranged to form an aperture, are disposed adjacent to and coaxial with the rotating disc 33. The unmasked segment formed by the fixed and movable masks is made proportional to the angular displacement of the elements to be measured. Light from a source 36 is interrupted by the fixed and movable masks 35, 34, respectively, and the rotating slotted disc 33, and after interruption is reflected from a spherical mirror 37 to a light responsive device 38, which may be a conventional photoelectric cell or electron multiplier.

The voltages on the leads 39 from the light responsive device 38 are applied to key a pulse oscillator 40. The pulses on the leads 39 are indicated by the square wave form 45, while the pulses generated by the pulse oscillator 40 are indicated by the wave form 46. The square wave voltage 45 will have a pulse interval α proportional to the angular displacement of the elements to be measured. This voltage keys the output of the pulse oscillator 40, in any conventional manner, to provide an output wave form indicated by the graph 47.

The motor 31 also drives a function generator 48 which provides a modulation voltage having a frequency synchronized with the repetition rate of the voltage wave form 45 derived from the light sensitive device 38. If desired, the function generator 48 may comprise a contact device actuated by the motor 31 to key a control bias voltage applied to a relaxation oscillator to provide a pulse of desired waveform for each revolution of the motor shaft. Many types of blocking and relaxation oscillators are well known, for example, in the television art. They may be selected to provide widely differing waveforms and may be synchronized readily by keyed bias or control voltages. A few of such devices are illustrated and explained in "Radio Engineers' Handbook" by F. E. Terman (McGraw-Hill) on pages 514–516. Since the function generator in some instances cannot be selected to provide the exact waveform required, the output of the function generator 48 may be applied to a wave-shaping circuit 49 which provides successive output pulses each having a waveform characteristic of the desired function of the angular displacement to be measured. Wave shaping circuits to change an applied signal to almost any desired waveform also are well known. They may comprise filter networks, diode, triode or other limiters, blocking or relaxation oscillators, differentiating or integrating circuits, delay circuits, etc. employed either singly or in combination in any known manner. A typical example of such wave shaping is found in the circuit of Fig. 3. It should be understood that any other suitable type of function generator such, for example, as a two pole rotary alternator, driven by the motor 31, may be employed with, or without, a wave shaping circuit to provide the desired function voltage waveform. By suitable filtering, limiting or other selection means, any desired portion of the synchronized generator wave may be applied to alter the frequency of the pulses of the pulse train 47.

For example, if the desired function is the sine or cosine of the angular displacement, the wave shape derived from the wave shaping circuit 49 will be a voltage having a sine wave form. If, on the other hand, the desired function of the angular displacement is the tangent, the output of the wave shaping circuit may be obtained by modifying a saw-tooth waveform. Other mathematical functions may be derived by generating and/or shaping the modulating potentials to provide other suitable characteristic waveforms.

The keyed pulse waveform 47 derived from the pulse oscillator 40 and the modulation waveform derived from the wave shaping circuit 49 are applied to a conventional frequency-modulator circuit 43. The output of the frequency modulator 43 provides a voltage wave form, indicated by the graph 51, which comprises trains of pulses in which the individual pulse period is determined by the modulation frequency. It will be noted that the individual pulse intervals (time between successive pulses) in the graph 51, are longer; or as in the graph 52, shorter than the respective pulse intervals in the graph 47. It should be understood that the successive pulse intervals in each pulse group may vary in accordance with the wave shape of the modulating potentials derived from the wave shaping circuit 49.

The modulated pulse trains 51 are applied to a frequency counting circuit 50, which may be of the type described in the article by H. Lifschutz and J. L. Lawson in the Review of Scientific Instruments, volume 9 of March, 1938. If desired, the pulse train 51 may be applied to the input terminals 10 of the frequency measuring circuit 50 described hereinafter in Figures 3 and 4, and described and claimed in the copending U. S. application Ser. No. 437,260, filed April 1, 1942, by Jan A. Rajchman and Edwin A. Goldberg. A current of amplitude substantially proportional to the number of pulses per unit time may be derived from the output of this frequency measuring circuit.

Figure 2 shows the arrangement of the fixed, movable and rotating masks of the device described in Figure 1. As explained heretofore, this structure provides pulses indicated by the graph 45, wherein the duration of each pulse is proportional to the angular displacement of the mechanical elements under observation which determine the angular displacement of the fixed and movable masks.

Referring to Fig. 3, the circuit 50 for utilizing the voltage pulses derived from the frequency modulating circuit 43 utilizes a unique arrangement of thermionic tube circuits including a band pass filter, one or more saturation amplifiers, a differentiating circuit, a peak amplifier, and a novel trigger circuit, as well as means for damping the differentiating circuit and the trigger circuit.

The source of voltage pulses, which may include a plurality of frequency components, is applied to the input terminals 10 of a filter circuit 9 which is designed to pass the frequency band which is to be measured. The output of the filter 9 is applied to the grid circuit of a first thermionic tube 1. The grid bias is adjusted to limit the amplitude of the signals to be measured in order to eliminate, as much as possible, response to extraneous signals. The first tube 1 is operated at the saturation portion of its static characteristic in order to derive an output signal which is substantially of square wave form. The signal is further amplified by the second thermionic tube 2 which is also operated at the saturation point of its static characteristic in order to further improve the square wave form of the signal. The signal of substantially square wave form is next applied to the input circuit of the third thermionic tube 3. The anode circuit of the third tube 3 includes a two-position switch 20 which is connected in one position to one terminal of a resistor 19 and in another position to one terminal of an inductor 11. The movable arm of the switch 20 is connected to the cathode of the first diode 4 and to one terminal of the capacitor 21. The remaining terminals of the resistor 19, inductor 11 and the anode of the first diode 4 are all connected through an anode resistor 24 to the source of high potential for the anode of the tube 3. The remaining terminal of the capacitor 21 is connected to the control electrode of a peak amplifier thermionic tube 5, which is biased to amplify only the voltage peaks of the applied signal. The cathode circuit of the third tube 5 includes a cathode resistor 22. Voltage across this resistor is applied to the cathode circuit of a first trigger tube 7. The control electrode of the first trigger tube 7 is connected to the anode of the second diode 6, to one terminal of the grid resistor 15, and to one terminal of the capacitor 13. The cathode of the second diode 6 and the remaining terminal of the resistor 15 are connected to ground. The remaining terminal of capacitor 13 is connected to the anode of the second trigger tube 8 and to one terminal of a resistance network 23. The remaining input terminal of the resistance network 23 is connected to a source of anode potential for the second trigger tube 8. The anode of the first trigger tube 7 is connected to the control electrode of the second trigger tube 8 and to one terminal of a coupling resistor 14. The remaining terminal of the resistor 14 is connected through the resistor 25 to a source of anode potential for the first trigger tube 7.

The operation of the circuit is as follows: The desired frequency component of the signal to be measured is derived from the filter 9 and applied to the control electrode of the first tube 1 which provides high amplification and because of its saturation characteristics, clips the peaks of the signal wave. The signal is further amplified and clipped by a similar action in the second tube 2 and applied as a signal of substantially square wave form to the input of the third tube 3. When the switch 20 is connected to the inductor 11, the third tube 3 is operated to shock-excite the tuned circuit comprising the natural resonant characteristics of the inductor 11, to derive a series of pulses of decreasing amplitude from each square wave pulse applied to the circuit. The first diode 4 provides considerable damping of the pulses of decreasing amplitude to eliminate substantially all of the pulse signal except the first positive cycle. If the switch 20 is connected to the resistor 19, the resistance capacity network 19—21 acts as a differentiating circuit. In this network, the voltage across the capacitor 21 will be substantially proportional to the rate of change of the square wave signal applied to the network and will therefore include only a sharp positive and negative pulse for each cycle of the square wave signal. When using the differentiating network, the damping diode 4 may be omitted, since it will have little effect on the circuit operation.

Signals derived from the circuit with either position of the switch 20 are then applied as pulses to the control electrode of the peak amplifier 5. If desired, either the inductor 11 or the resistor 19, and the switch 20 may be omitted. This tube is biased to clip off and amplify only a positive peak portion of the pulse applied to the control electrode.

Sharply peaked voltages from the cathode circuit of the peak amplifier 5 are taken from across the cathode resistor 22 connected to the cathode of the peak amplifier 5 and applied to the input circuit of the first trigger tube 7.

The operation of the trigger circuit is as follows: The first trigger tube 7 is biased so that it is normally conducting while the second trigger tube 8 is biased so that it is normally non-conducting. When a positive pulse from the peak amplifier 5 is applied to the cathode of the first trigger tube 7, the first trigger tube 7 is biased to cut-off and the second trigger tube 8 is made to conduct. This condition continues after the exciting pulse has passed, and until the grid of the first trigger tube 7 which has been driven to cut off by the charge on the capacitor 13 becomes sufficiently positive for the first trigger tube 7 to again become conducting and the second trigger tube 8 non-conducting. For a single exciting pulse, the time during which the second trigger tube 8 will become conducting depends upon the capacitance of the capacitor 13, the grid capacitance of the first trigger tube 7, the resistance of the resistors 14 and 15, the cut-off voltage of the first trigger tube 7 as well as the rate of change of the maximum voltage on the anode of the second trigger tube 8 when the tube is suddenly made to conduct. Since all of these constants can be calculated and fixed, the circuit can be adjusted to any desired time constant. The limit frequency of the circuit is dependent on the time required for the trigger tubes to return to their normal bias condition after actuation by an exciting pulse. This time interval may be greatly reduced by the use of the second diode 6 which has a damping action on the grid circuit of the first trigger tube 7 by providing substantial attenuation in the circuit when the grid of the first trigger tube 7 is at positive potential. The action of the second diode 6 also tends to make the duration of the current pulse in the anode circuit of the second trigger tube 8 more uniform. The amplitude of this pulse may be maintained at a substantially constant level by proper voltage regulation of the potentials applied to the trigger tube circuits. The current derived from the output terminals 12 of the resistance network 23 will be a fairly accurate indication of the average rate of occurrence of the exciting pulses applied to the cathode of the first trigger tube 7.

Figure 4A:
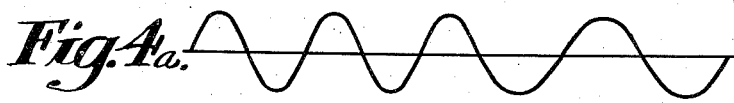
Figure 4B:
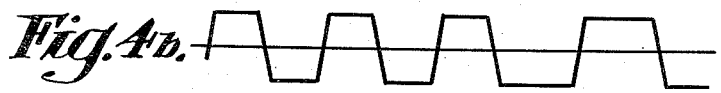
Figure 4C:
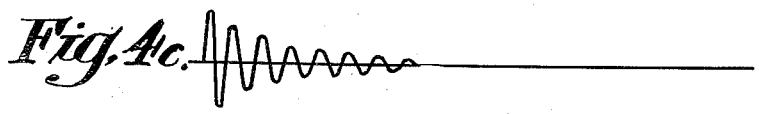
Figure 4D:
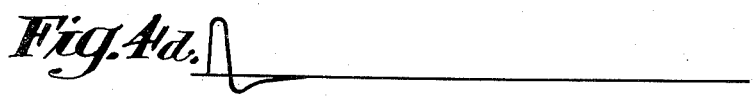
Figure 4E:
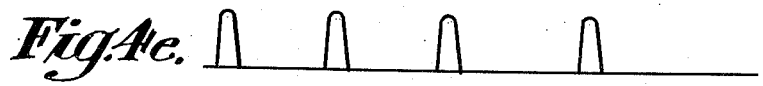
Figure 4F:
Figure 4G:

Fig. 4a of the drawing shows a typical sine wave signal applied to the input circuit of the first saturation amplifier tube 1. Fig. 4b shows a signal of substantially square wave form derived from the anode circuit of the second tube 2 and applied to the input circuit of the third tube 3. Fig. 4c shows the wave form comprising pulses of diminishing amplitude derived from the tuned circuit 11 when the switch 20 is connected to the inductor 11. Fig. 4d shows the damping of the pulse current by the first diode 4. The portion of the graph above the dashed line P indicates the positive portion of the pulse current which actuates the peak amplifier tube 5. Fig. 4e shows the positive pulse derived from across the resistor 22 in the cathode circuit of the peak amplifier tube 5. Fig. 4g shows the potential variations on the grid of the first trigger tube 7 caused by the application of the pulse shown in Fig. 4e. Fig. 4f shows the corresponding potential variations in the anode circuit of the second trigger tube 8 which are applied to the resistance network 23. The dashed lines in Fig. 4g indicates the damping action of the second diode 6 and clearly show the action of this tube in decreasing the time required for the trigger tubes 7 and 8 to return to their normal bias condition.

It should be understood that the filter 9, tubes 1, 2, 3, 4 and 5, or any of them, may be omitted if the signal to be measured has suitable characteristics for the actuation of the trigger circuit comprising the tubes 6, 7, and 8. It should also be understood that the second diode 6 may be omitted if the operating frequency of the circuit is sufficiently low to permit the trigger tubes 7 and 8 to return to normal bias condition without the damping action of the second diode 6.

I claim as my invention:

1. In a computer for substantially continuously deriving a non-linear mathematical function of the variable angular displacement of two elements, means for forming an aperture the angular opening of which is a linear function of said angle, means for deriving voltage pulses of duration proportional to said angular opening, means for modulating said pulses in accordance with said mathematical function, and means for deriving a signal current of amplitude proportional to the average frequency of said modulated pulses.

2. Apparatus of the type described in claim 1 including a source of light, means for scanning said aperture by said light, and light responsive means for deriving said voltage pulses.

3. In a computer for substantially continuously deriving a non-linear mathematical function of the variable angular displacement of two elements, a fixed mask, a movable mask disposed to form an adjustable aperture the angular opening of which is a linear function of said angular displacement, a light source, a light responsive device associated with said light source, means for scanning said adjustable aperture by said light to derive voltage pulses from said light responsive device, a pulse generator, means for keying said generator by said voltage pulses, a modulation generator providing a voltage wave form characteristic of said function, means for applying said modulation frequency to frequency modulate said keyed pulses, and means for deriving from said modulated keyed pulses a signal current of amplitude substantially proportional to the duration of said voltage pulses to indicate the value of said function.

4. Apparatus of the type described in claim 3 including a disc having a radial slit and means for rotating said disc to scan said aperture by said light.

5. Apparatus of the type described in claim 3 including a disc having a fixed aperture and means for rotating said disc to scan said adjustable aperture by said light.

6. Apparatus of the type described in claim 3 including a reflector disposed adjacent said light responsive device for collecting said interrupted light and applying said collected light to said light responsive device.

7. Apparatus of the type described in claim 1 including a source of light, means for scanning said aperture at a substantially constant velocity by said light, and light responsive means for deriving said voltage pulses.

JAMES L. WHITTAKER.

REFERENCES CITED

The following references are of record in the file of this patent:

UNITED STATES PATENTS

| Number | Name | Date |
|---|---|---|
| 2,176,720 | Rayner | Oct. 17, 1939 |
| 2,277,285 | Woodling | Mar. 24, 1942 |

FOREIGN PATENTS

| Number | Country | Date |
|---|---|---|
| 460,187 | Great Britain | Jan. 18, 1937 |